(12) United States Patent
Ito

(10) Patent No.: US 8,753,766 B2
(45) Date of Patent: Jun. 17, 2014

(54) ELECTRIC STORAGE DEVICE

(75) Inventor: Syun Ito, Kyoto (JP)

(73) Assignee: GS Yuasa International Ltd., Kyoto-Shi, Kyoto (JP)

( * ) Notice: Subject to any disclaimer, the term of this patent is extended or adjusted under 35 U.S.C. 154(b) by 120 days.

(21) Appl. No.: 13/363,655

(22) Filed: Feb. 1, 2012

(65) Prior Publication Data

US 2012/0202107 A1 Aug. 9, 2012

(30) Foreign Application Priority Data

Feb. 3, 2011 (JP) ................................ 2011-021984
Jan. 10, 2012 (JP) ................................ 2012-001986

(51) Int. Cl.
*H01M 2/00* (2006.01)

(52) U.S. Cl.
USPC ........... 429/169; 429/163; 429/164; 429/170; 429/171; 429/181; 429/185

(58) Field of Classification Search
USPC ................. 429/163, 164, 166, 170, 171, 174, 429/178–181, 184, 185, 169
See application file for complete search history.

(56) References Cited

U.S. PATENT DOCUMENTS

| 2003/0124420 | A1 | 7/2003 | Fong et al. | |
| 2004/0086783 | A1* | 5/2004 | Fong et al. | 429/181 |
| 2006/0073382 | A1 | 4/2006 | Urano et al. | |
| 2008/0241679 | A1 | 10/2008 | Okutani et al. | |
| 2010/0129708 | A1* | 5/2010 | Ishii | 429/178 |
| 2010/0297490 | A1* | 11/2010 | Takami et al. | 429/131 |
| 2011/0039136 | A1* | 2/2011 | Byun et al. | 429/56 |

FOREIGN PATENT DOCUMENTS

| JP | 2003-157812 A | 5/2003 |
| JP | 2004-111300 A | 4/2004 |
| JP | 2008-305644 A | 12/2008 |
| JP | 2010-97764 A | 4/2010 |

OTHER PUBLICATIONS

Extended European Search Report dated Jun. 1, 2012.

* cited by examiner

*Primary Examiner* — Jonathan G Leong
*Assistant Examiner* — James Erwin
(74) *Attorney, Agent, or Firm* — McGinn IP Law Group, PLLC

(57) ABSTRACT

An electric storage device including a case, a positive electrode, a negative electrode, a current collector, a gasket, and a conductive member. The current collector has a first end connected to the positive electrode or the negative electrode and a second end electrically connected to an inner surface of the case. The conductive member includes a body and an inside large-diameter portion having a larger diameter than that of the body. The body is arranged in a mounting hole of the case. The inside large-diameter portion is disposed at one end of the body inside the case, and electrically connected to a second end of the current collector. The inside large-diameter portion is arranged so as to be in contact with an inner gasket such that the inner gasket and the second end of the current collector are sandwiched between the inside large-diameter portion and the case.

19 Claims, 10 Drawing Sheets

ELECTRIC STORAGE DEVICE

CROSS REFERENCE TO RELATED APPLICATION

This application claims priority from Japanese Patent Application No. 2011-021984 filed on Feb. 3, 2011, and Application No. 2012-001986 filed on Jan. 10, 2012. The entire content of these priority applications is incorporated herein by reference.

TECHNICAL FIELD

The present invention relates to an electric storage device including a case electrically connected to a positive electrode or a negative electrode.

BACKGROUND

Batteries including a non-aqueous electrolyte secondary battery, a nickel-cadmium battery, and a nickel metal hydride battery are widespread as a power source of mobile electronic equipment such as a mobile phone, a personal computer and a video camera by taking advantage of the characteristics of being compact and lightweight and having high energy density. Nowadays, there is a strong move afoot to upsize such batteries and apply the batteries to large electric equipment for industrial use, such as an electric vehicle. Such batteries are those where a winding type power generating element that strip electrodes are wound via a separator, or a stack type power generating element that flat-plate electrodes are laminated via a separator is housed in a battery case, the battery case is sealed with a battery lid, and a positive terminal and a negative terminal are attached to the exterior of the battery. Commonly used is a configuration where a battery case serves as one electrode terminal and the other electrode terminal is attached to the exterior of the battery in a state of being insulated from the battery case.

However, there is a problem in a conventional battery whose case is electrically connected to a positive or negative electrode, that is, the case has electric continuity. Namely, the battery tends to have a complex configuration for electrically connecting a current collector, the case, and a conductive member such as an electrode terminal while a gap between the case and the conductive member is limited, and a large number of parts.

The present invention has been made considering the above circumstances, and an object thereof is to provide an electric storage device with a simple configuration including a current collector, a case, and a conductive member electrically connected with each other while a gap between the case and the conductive member is limited.

SUMMARY

An electric storage device according to an aspect of the present invention includes a case, a positive electrode, a negative electrode, a current collector, a gasket, and a conductive member. The case has a mounting hole. The positive electrode and the negative electrode are housed in the case. The current collector has a first end and a second end. The first end is connected to any one of the positive electrode and the negative electrode. The second end is electrically connected to an inner surface of the case. The gasket includes an inner gasket in contact with an area of the inner surface between the mounting hole and the second end of the current collector. The conductive member includes a body and an inside large-diameter portion having a larger diameter than that of the body. The body is arranged in the mounting hole of the case. The inside large-diameter portion is disposed at one end of the body inside the case, electrically connected to the second end of the current collector, and arranged so as to be in contact with the inner gasket such that the inner gasket and the second end of the current collector are sandwiched between the inside large-diameter portion and the case.

Since the second end of the current collector and the conductive member are electrically connected, a potential at the positive or negative electrode is extracted to the outside via the conductive member. Moreover, since the second end of the current collector and the inner surface of the case are electrically connected, the case is at the same potential as the positive or negative electrode. Additionally, the gasket is sandwiched between the inner surface of the case and the inside large-diameter portion of the conductive member. Accordingly, the case, the current collector and the conductive member are electrically connected while a gap between the case and the conductive member is limited.

In the above electric storage device, the inner gasket may be sandwiched between the second end of the current collector and the body of the conductive member.

According to this configuration, the gasket is sandwiched between the second end of the current collector and the body of the conductive member, and therefore a gap is less likely to be formed between the current collector and the conductive member.

In the above electric storage device, the conductive member may include an outside large-diameter portion having a larger diameter than that of the body. The outside large-diameter portion is disposed at another end of the body outside the case. The gasket may further include an outer gasket sandwiched between the outside large-diameter portion of the conductive member and the outer surface of the case.

According to this configuration, a gap is further less likely to be formed between the case and the conductive member.

The electric storage device may include an outer washer having a smaller diameter than that of the outer gasket. The outer washer is disposed between the outside large-diameter portion of the conductive member and the outer gasket.

According to this configuration, the case, the gasket and the current collector are more strongly held between the outside large-diameter portion and the inside large-diameter portion.

Moreover, in the above electric storage device, the outer gasket may include a projection in contact with an outer peripheral surface of the outer washer. Accordingly, the outer gasket and the outer washer are less likely to be displaced.

In the above electric storage device, the inner gasket and the outer gasket may be made of different materials.

For example, the inner gasket may be made of a material having at least one of higher elasticity, airtightness, heat resistance, an insulation property, and corrosion resistance than the outer gasket. Accordingly, the inner and outer gaskets can be made of suitable materials, respectively.

In the above electric storage device, the gasket may include a tubular gasket having an outer peripheral surface and an inner peripheral surface. The outer peripheral surface may be in contact with a wall of the mounting hole. The inner peripheral surface may be in contact with the body of the conductive member. The tubular gasket may be integrally formed with at least one of the inner gasket and the outer gasket. The at least one of the gaskets may have a through hole with an edge the tubular portion for an entire outer circumference.

According to this configuration, the positional relationship between the case and the conductive member can be maintained while a gap between them is limited. Furthermore, the one of the gaskets can be more flexibly deformed in comparison to a gasket that is in direct contact with the conductive member without being through the tubular portion.

In the above electric storage device, the conductive member may have a sloped surface angled with respect to an axis of the body. Furthermore, the second and the inner gasket may be in contact with the sloped surface.

According to this configuration, a contact area between the second end and the inner gasket is larger in comparison to a contact area between a current collector and a gasket, surfaces of which in contact are parallel to the axis of the body. Accordingly, a gap is further less likely to be formed.

The electric storage device may further include an inner washer disposed between the second end of the current collector and the inside large-diameter portion of the conductive member.

According to this configuration, the case, the gasket and the current collector are more tightly held between the outside large-diameter portion and the inside large-diameter portion.

According to the aspect of the present invention, an electric storage device with a simple configuration including the current collector, the case, and the conductive member electrically connected while a gap between the case and the conductive member is limited.

BRIEF DESCRIPTION OF THE DRAWINGS

Illustrative aspects in accordance with the invention will be described in detail with reference to the following figures.

DETAILED DESCRIPTION

A battery according to the present embodiment (hereinafter referred to as "the battery") includes a case, a positive electrode, a negative electrode, and positive and negative terminal assemblies. The positive electrode and the negative electrode are housed in the case. The positive and the negative terminal assemblies are provided for the positive electrode and the negative electrode, respectively, and arranged on the case. Each of the terminal assemblies includes a current collector, an outer gasket, an inner gasket, and a conductive member. The current collector is electrically connected to the case and the conductive member. The case is electrically connected to the positive electrode or the negative electrode. The case may be electrically connected to the negative electrode; however, the case is electrically connected to the positive electrode in the following example. The case includes a container having a predetermined capacity and a lid arranged so as to cover an opening of the container. The embodiment will be explained with reference to the drawings.

External Configuration of the Battery

Figure 1:
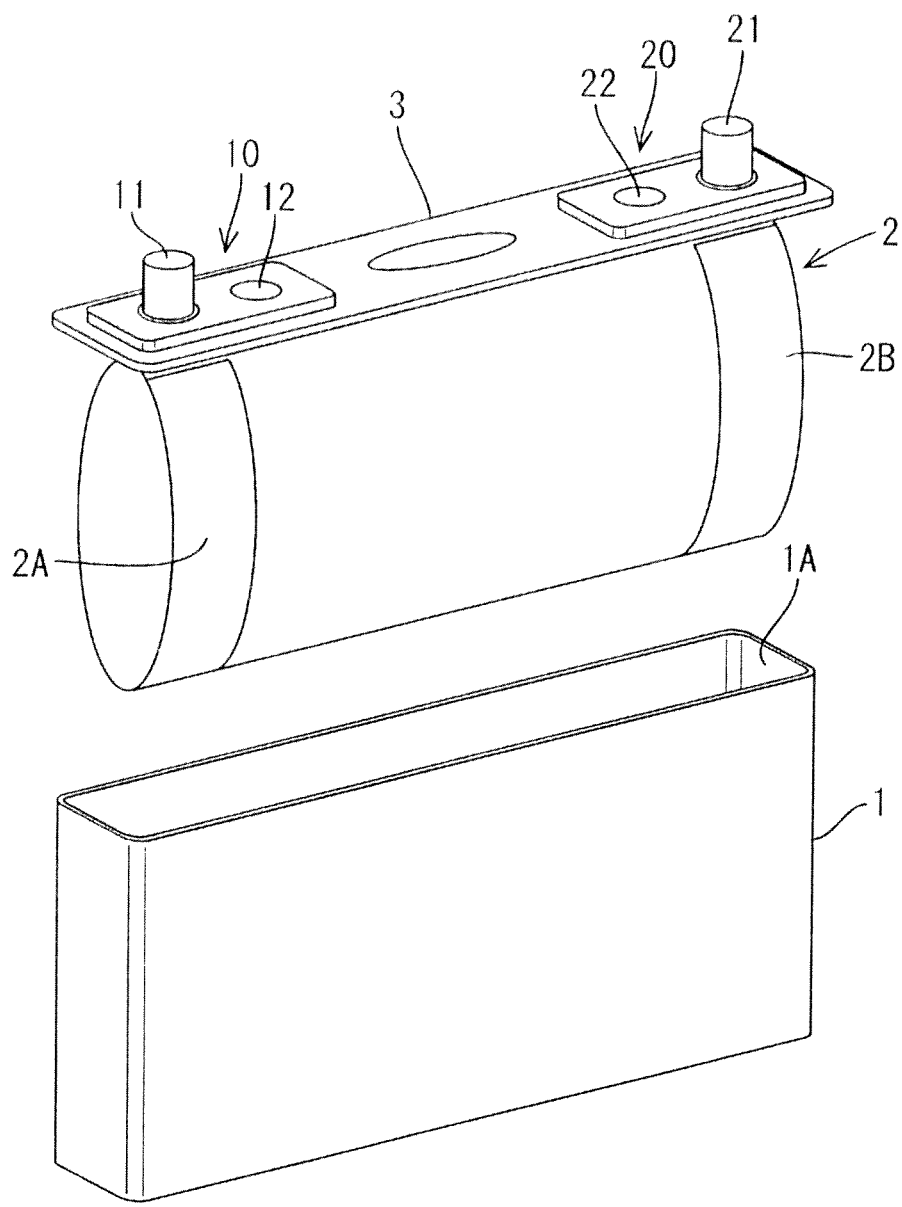
FIG. 1 is a schematic perspective view of a battery according to an embodiment.

As illustrated in FIG. 1, the battery includes a container 1 having a predetermined capacity, a positive electrode 2A and a negative electrode 2B, a lid 3. The container 1 has an opening 1A. The positive electrode 2A and the negative electrode 2B are housed in the container 1. The lid 3 is arranged so as to cover the opening 1A of the container 1. The container 1 and the lid 3 are configured as a battery case.

The lid 3 is a rectangular flat plate having predetermined strength as a housing. A positive terminal assembly 10 is arranged in an area of the lid 3 close to one of ends of the lid 3 (on the left side in FIG. 1) and the negative terminal assembly 20 is arranged in an area thereof close to the other end (on the right side in FIG. 1). The positive terminal assembly 10 is provided with an external terminal 11 and a rivet 12, and the terminal assembly 20 for the negative electrode is provided with an external terminal 21 and a rivet 22.

The electrodes 2A and 2B are arranged in the container 1 and edges of the lid 3 in the opening 1A are sealed. Namely, the electrodes 2A and 2B are held in closed space inside the container 1. The container 1 has a thin box shape with an opening at an upper end. The container 1 is made of metal having strength appropriate as a housing (for example, stainless and aluminum). Because the container 1 is made of metal, the case has an electric potential. The edges of the lid 3 may be welded to the container 1. However, a method for fixing the lid 3 to the container 1 is not limited to the welding. The lid 3 may be fixed to the container 1 with an adhesive, or clamped to the container 1 with projections extending from the edges of the lid 3.

Configuration of Terminal Assembly of the Battery (1) Structure of Positive Terminal Assembly The positive terminal assembly 10 includes a current collector 13, an inner gasket 14, an outer gasket 15, and the rivet 12. A first end of the current collector 13, which is not illustrated, is connected to the positive electrode 2A, and the second end 13A thereof is in surface contact with an internal surface 3A of the lid 3 and electrically connected to the lid 3 and the rivet 12. Specifically, a round mounting hole 3B with a diameter D1 is formed through the one end side of the lid 3. An insertion hole 13B with a diameter D2 that is larger than the diameter D1 is formed on the same axis as the mounting hole 3B and through the second end 13A of the current collector 13.

The inner gasket 14 has a ring-like overall shape. The inner gasket 14 has an outside diameter substantially the same as the diameter D2 and an inner diameter substantially the same as the diameter D1 when it is compressed. An outer peripheral surface of the inner gasket 14 is in close contact with an inner wall of the insertion hole 13B for an entire circumference thereof. The top surface of the inner gasket 14 is in close contact with the inner surface 3A of the lid 3 for the entire circumference. The inner gasket 14 enhances sealing between the outer gasket 15 and the rivet 12, and the lid 3. Furthermore, the inner gasket 14 reduce heat transmission from the current collector 13, which becomes relatively high temperature, to the lid 3.

The outer gasket 15 is separately provided from the inner gasket 14. The outer gasket 15 includes a tubular portion 15A having a tubular shape and a base portion 15B having a disk shape. The base portion 15B is provided integrally with an upper outer peripheral surface of the tubular portion 15A. The tubular portion 15A has an outside diameter substantially the same as the diameter D1 and an inside diameter substantially the same as an outside diameter D3 of a body 12A of the rivet 12 when it is compressed. The tubular portion 15A is press-fitted in the mounting hole 3B of the lid 3 and the insertion hole 13B of the current collector 13. The outer peripheral surface of the tubular portion 15B is in close contact with the lid 3 and the inner gasket 14 for an entire circumference thereof. Moreover, an entire undersurface of the base portion 15B is in close contact with the outer surface of the lid 3.

The rivet 12 includes the body 12A, a head 12B, a flange 12C. The head 12B is provided integrally with one end of the body 12A (the top end in FIG. 2). The flange 12C is provided integrally with the other end of the body 12A (the bottom end in FIG. 2). The rivet 12 is an example of the conductive member, the head 12B is an example of the outside large-diameter portion, and the flange 12C is an example of the inside large-diameter portion. The body 12A has a round column-like shape with the outside diameter of the diameter D3, and is press-fitted in the tubular portion 15A of the outer gasket 15. The outside diameters of the head 12B and the flange 12C are larger than the outside diameter of the body 12A.

In manufacturing of the battery, the rivet 12 without the flange 12C is inserted into the tubular portion 15A of the outer gasket 15, and the bottom end of the body 12A is flattened. As a result, the flange 12C is created. Accordingly, the base portion 15B of the outer gasket 15, the lid 3, the second end 13A of the current collector 13 and the inner gasket 14 are sandwiched between the head 12B and the flange 12C of the rivet 12. The outer gasket 15, the current collector 13, and the inner gasket 14 are fixed to the lid 3.

Before the flange 12C is formed, the inner gasket 14 is in a free state and has a thickness larger than that of the current collector 13. The inner gasket 14 protrudes lower than the current collector 13. With elasticity of the inner gasket 14, a pressing force applied to the current collector 13 by the flange 12C during the flattening of the rivet 12 is reduced. Accordingly, the current collector 13 is less likely to be damaged. Moreover, The diameter of the body 12A of the rivet 12 becomes larger after the rivet 12 is flattened. Accordingly, the inner gasket 14 and the tubular portion 15A of the outer gasket 15 are compressed and sandwiched between the body 12A of the rivet 12 and the second end 13A of the current collector 13. The inner gasket 14 and the tubular portion 15A are deformed and therefore the gaps between the lid 3, the rivet 12 and the current collector 13 are more properly filled.

The inside diameter D2 of the insertion hole 13B of the current collector 13 is smaller than the outside diameter of the flange 12C. Therefore, the outer portion of the flange 12C comes into contact with the current collector 13. A positive potential can be achieved through the positive terminal assembly 10. Furthermore, because the current collector 13 is electrically connected to the container 1 via the lid 3, the case has a potential. As illustrated in FIG. 1, an external terminal 11 is electrically connected to the rivet 12 of the positive terminal assembly via a coupling body, which is not illustrated. The external terminal 11 may not be provided. In that case, the head 1213 of the rivet 12 may be used as an external terminal.

The positive terminal assembly 10 has the above configuration for electrically connecting the lid 3, the current collector 13 and the rivet 12 by holding the outer gasket 15, the lid 3, the current collector 13, and the inner gasket 14 between the head 12B and the flange 12C of the rivet 12. In the manufacturing of the battery, the lid 3, the current collector 13, and the rivet 12 are fixed to one another in an environment where substances that may produce an adverse effect on the function of a battery, such as dust from welding and spatters, are not less likely to exist. Moreover, the outer gasket 15 seals the gap between the lid 3 and the rivet 12. Therefore, the inner space of the case is not subjected to outside air. The outer gasket 15 also electrically isolates the components of the battery from one another except for between the current collector 13 and the lid 3, and between the current collector 13 and the rivet 12. In this embodiment, the rivet 12 is used as the conductive member. However, the conductive member is not limited to the rivet. The conductive member may be a screw having a head and a nut screwed together.

(2) Structure of Negative Terminal Assembly

Figure 3:
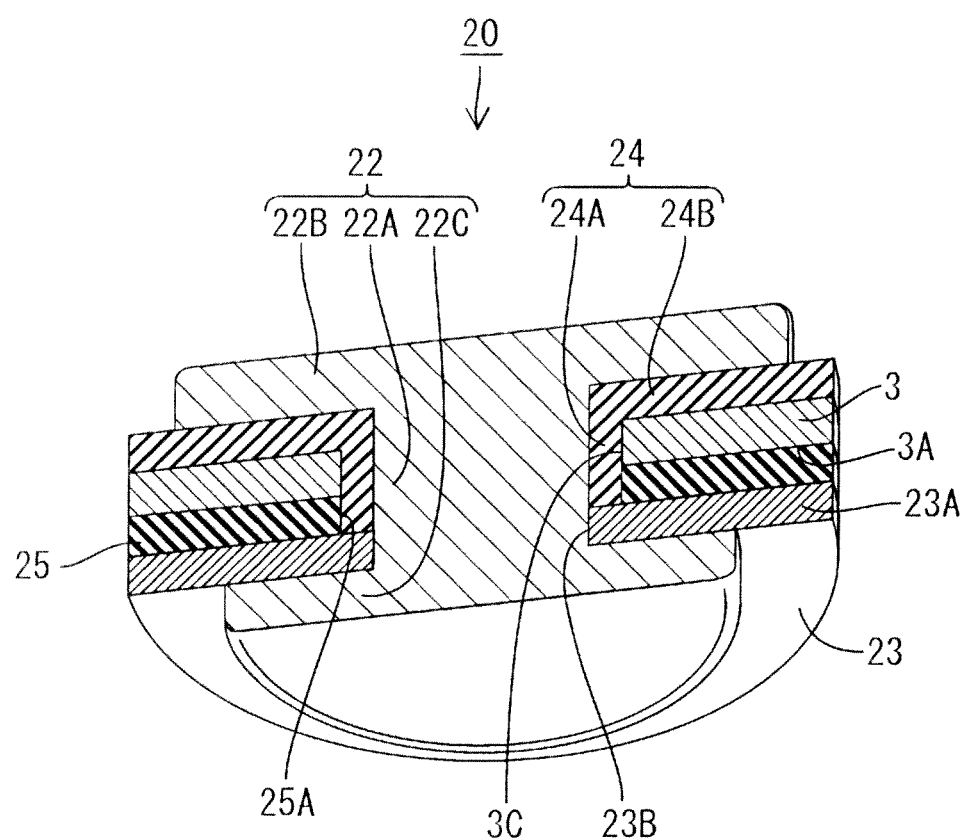
FIG. 3 is a schematic view illustrating a configuration of the battery around a negative assembly.

As illustrated in FIG. 3, the negative terminal assembly 20 includes a current collector 23, an outer gasket 24, an inner gasket 25, and a rivet 22. A first end of the current collector 23, which is not illustrated, is connected to the negative electrode 2B. The second end 23A of the current collector 23 is insulated from the lid 3 by the inner gasket 25 and electrically connected to the rivet 22. Specifically, a round mounting hole 3C is formed through the second end of the lid 3, and an insertion hole 23B is formed through the second end 23A of the current collector 23. The insertion hole 23B has a smaller diameter than that of the mounting hole 3C.

The inner gasket 25 is arranged between the inner surface 3A of the lid 3 and a top surface of the current collector 23. The inner gasket 25 is in close contact with the inner surface 3A and the top surface. The inner gasket 25 has an insertion hole 25A with substantially the same diameter as that of the mounting hole 3C formed therethrough. The outer gasket 24 includes a tubular portion 24A and a base portion 24B, which have substantially the same shapes as the tubular portion 15A and the base portion 15B of the outer gasket 15, respectively. The tubular portion 24A is press-fitted in the mounting hole 3C of the lid 3 and the insertion hole 25A of the inner gasket 25. The lid 3 and the inner gasket 25 are in close contact with an outer peripheral surface of the tubular portion 24A for an entire circumference. Moreover, an entire bottom end surface of the tubular portion 24A is in close contact with the current collector 23.

The rivet 22 includes a body 22A, a head 22B, and a flange 22C. The head 22B is provided at one end of the body 22A (the top end of the body 22A in FIG. 2). The flange 22c is provided at the other end of the body 22A (the bottom end of the body 22A in FIG. 2). The outside diameter of the body 22A is substantially the same as the inside diameter of the tubular portion 24A of the outer gasket 24 and the insertion hole 23B of the current collector 23. The outside diameters of the head 22B and the flange 22C are larger than the outside diameter of the body 22A. In the manufacturing of the battery, the rivet 22 without the flange 22C is inserted into the tubular portion 24A of the outer gasket 24, and the bottom end of the body 22A is flattened. As a result, the flange 22C is created. Accordingly, the base portion 24B of the outer gasket 24, the lid 3, the inner gasket 25, and the second end 23A of the current collector 23 are sandwiched between the head 22B and the flange 22C of the rivet 22. The outer gasket 24, the inner gasket 25 and the current collector 23 are fixed to the lid 3.

The rivet 22 is electrically connected to the current collector 23; however, the lid 3 is insulated from the rivet 22 and the current collector 23 by the outer gasket 24 and the inner gasket 25. As illustrated in FIG. 1, the external terminal 21 of the negative terminal assembly 20 is electrically connected to the rivet 22 via a coupling body, which is not illustrated. The external terminal 21 may not be provided. In that case, the head 22B of the rivet 22 may be used as an external terminal.

The negative terminal assembly 20 has the above configuration for electrically connecting the lid 3 and the rivet 22 by holding the outer gasket 24, the lid 3, the inner gasket 25 and the current collector 23 between the head 22B and the flange 22C of the rivet 22. In the manufacturing of the battery, the current collector 23 and the rivet 22 are fixed and electrically connected to each other in an environment where substances that may produce an adverse effect on the function of a battery, such as dust from welding and spatters, are not less likely to exist. Moreover, the outer gasket 24 and the inner gasket 25 seals the gap between the lid 3 and the rivet 22. Therefore, the inner space of the case is not subjected to outside air. The outer gasket 24 also electrically isolates the components of the battery from one another except for between the current collector 23 and the rivet 22.

The lid 3 has predetermined strength as a housing. The lid 3 is made of material having electric conductivity, such as stainless and aluminum and thus the case has an electric potential. The lid 3 is electrically connected to the current collector 13 through the positive terminal assembly 10. The lid 3 is further electrically connected to the container 1. Accordingly, the case has the positive potential.

The current collectors 13 and 23 have predetermined strength, and are easy to be processed. Materials having good electric conductivity with low electric resistance are suitable for the current collectors 13 and 23, and copper, aluminum, or the like is used. Lightweight metals with good electric conductivity are used as materials of the current collectors 13 and 23. Aluminum or copper may be used. The current collectors 13 and 23 are in contact with the flanges 12C and 22C of the rivets 12 and 22 to establish electric continuity, and therefore a potential at any one of the positive electrode and the negative electrode can be achieved. Furthermore, the current collectors 13 and 23 are in contact with the outer gaskets 15 and 24 and the inner gaskets 14 and 25 to secure the sealing performance.

The outer gaskets 15 and 24 and the inner gaskets 14 and 25 are insulators having elasticity, heat resistance, corrosion resistance, and airtightness. A material suitable for the outer gaskets 15 and 24 and the inner gaskets 14 and 25 may have flexibility that can make close contact with the lid 3 so that the leak of an electrolyte is less likely to occur. Specifically, polyphenylene sulfide (PPS), tetrafluoroethylene/perfluoro alkyl vinyl ether copolymer (PFA), polypropylen (PP), or polyethylene terephthalate (PET) may be used. In this embodiment, the outer gaskets 15 and 24 are provided separately from the inner gaskets 14 and 25. An expensive material having high corrosion resistance may be used for the inner gaskets 14 and 25 that require especially corrosion resistance and heat resistance. An inexpensive material having lower corrosion resistance and the like than the inner gaskets 14 and 25 may be used for the outer gaskets 15 and 24. With the above configuration, the cost of the entire gaskets can be reduced. The outer gasket 24 and the inner gasket 25 may not be limited to separate gaskets, but may be formed integrally.

Figure 2:
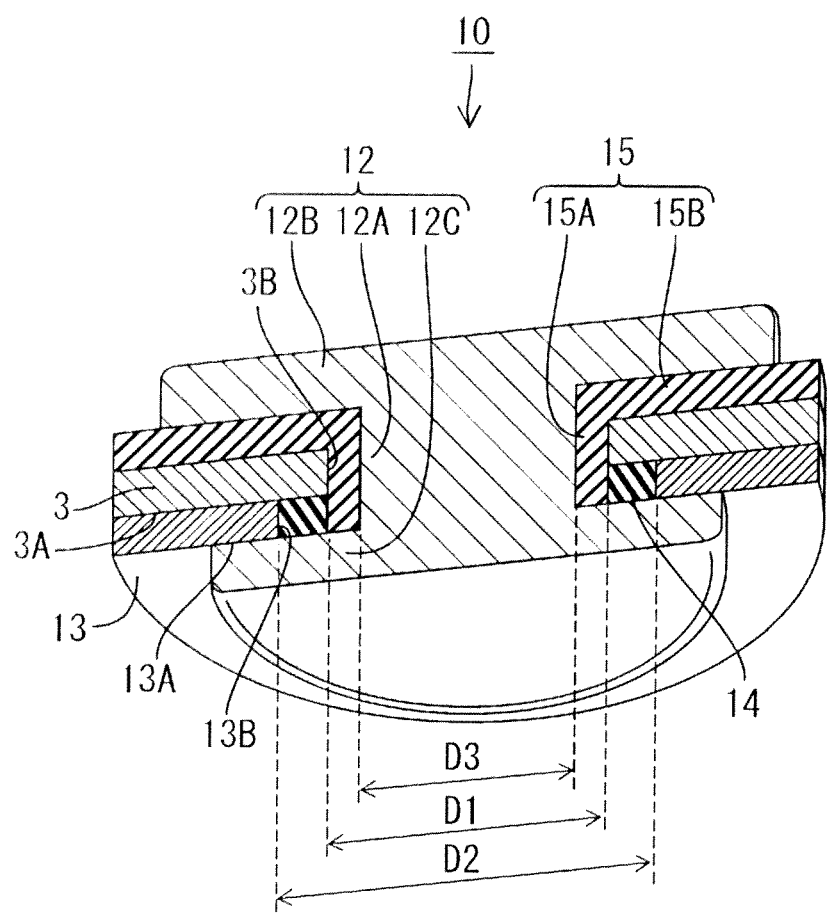
FIG. 2 is a schematic view illustrating a configuration of the battery around a positive terminal assembly.

The rivets 12 and 22 require high electric conductivity, lightweight, and flexibility for flattening. The rivets 12 and 22 also require the strength to maintain the shapes after the flattening. Appropriate material for the rivets 12 and 22 includes aluminum and copper. In FIGS. 2 and 3, the rivets 12 and 22 have the heads 12B and 22B arranged in the upper part of the terminal assemblies 10 and 20. The bottom ends of the bodies 12A and 22A are flattened. However, the rivets 12 and 22 are not limited to the above configurations. Rivets without a head have both ends flattened may be used. Alternatively, tubular rivets each having a hollow body to which a wedge-shaped body is nailed for fixing can be used.

(3) Battery of Comparative Example

Figure 4:
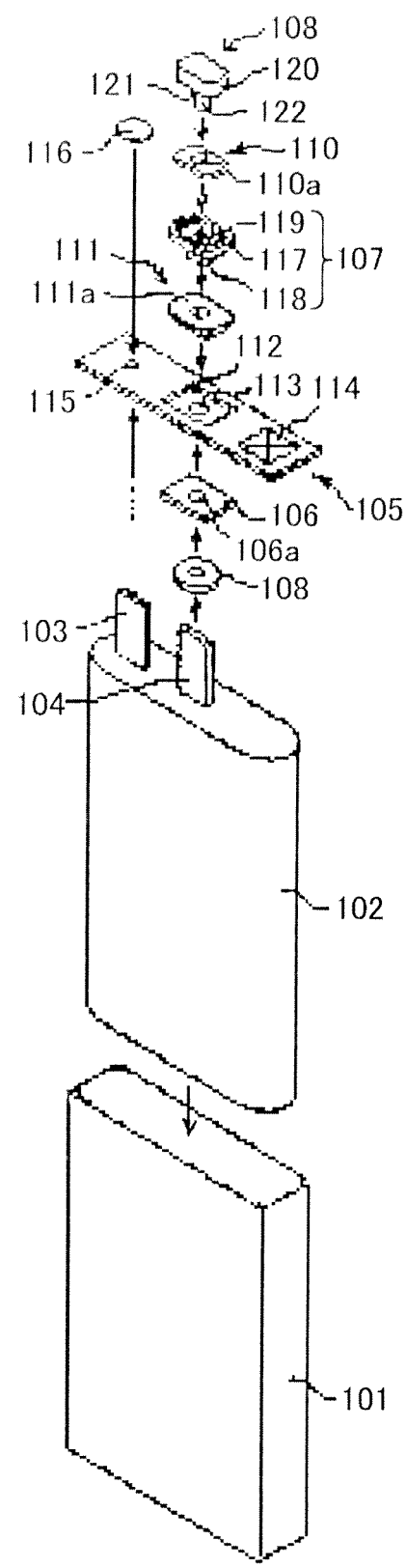
FIG. 4 is an exploded view illustrating a configuration of a battery of a comparative example.
Figure 5:
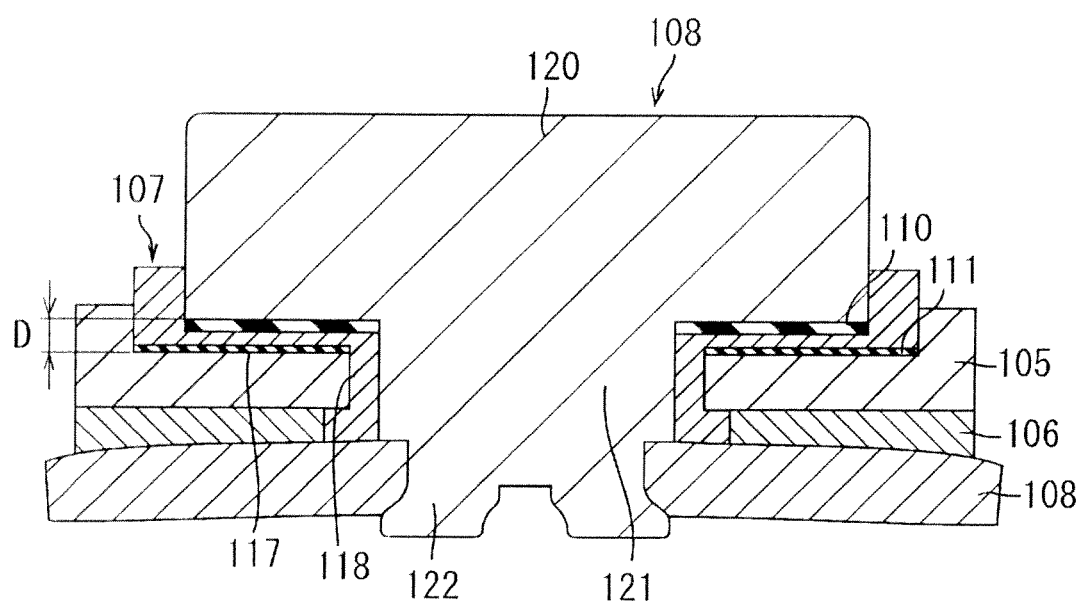
FIG. 5 is a cross-sectional view of a part of the battery of the comparative example.

A battery of a comparative example is illustrated in FIGS. 4 and 5. The battery includes a container 101, a battery lid 105, an insulating gasket 107, a rivet 108, a shank 122, an insulating gaskets 110 and 111 (cf. JP-A-2008-305644) The battery lid 105 is arranged so as to cover an opening of the container 101 and having a mounting hole 113. The insulating gasket 107 has a tubular portion 118 inserted into the mounting hole 113 of the battery lid 105 and a flange 117 formed on the perimeter of one opening end of the tubular portion 118. The rivet 108 for an output terminal of a positive or negative electrode has a shank 122 and a head 120. The shank 122 is inserted in the tubular portion 118 of the insulating gasket 107 and fixed to the battery lid 105. The head 120 is formed at one end of the shank 122 and arranged on the battery lid 105 via the flange 117 of the insulating gasket 107. The insulating gaskets 110 and 111 are arranged at least one of between the head 120 of the rivet 108 and the flange 117 of the insulating gasket 107 and between the battery lid 105 and the flange 117 of the insulating gasket 107. The battery includes an electrode 102, a round hole 106a, rivet insertion holes 110a and 111a, and a vent 114.

Sealing members are attached in the following procedure.

(1) The second insulating gasket 111 is placed in a recess 112 of the battery lid 105, and the boss 118 of the insulating gasket 107 is inserted into the mounting hole 113 of the battery lid 105 to fit them together.

(2) The first insulting gasket 110 is inserted into the flange 117 of the insulating gasket 107, and furthermore a shank 121 of the rivet 108 is inserted into a shank insertion hole 119 of the insulating gasket 107 to fit them together.

(3) The shank 121 penetrating downward from the battery lid 105 is subsequently inserted into a washer 109 via an insulating plate 106.

(4) Next, downward pressure is applied to the head 120 of the rivet 108 to fix a position thereof while upward pressure is applied to the bottom end of the upsetting shank 122. Accordingly, the shank 121 and the upsetting shank 122 of the rivet 108 slightly enlarge diameters thereof to be deformed (expand to be deformed) compared with a free state thereof. As a result, the shank 121 of the rivet 108 comes into intimate contact with the shank insertion hole 119 of the insulating gasket 107 to seal a gap between the mounting hole 113 of the battery lid 105 and the insulating gasket 107, in other words, the rivet 108 is upset to be fixed to the battery lid 105 via the insulating gasket 107.

(5) A conductive tab 104 on the negative electrode side is welded to the washer 109, and a conductive tab 103 on the positive electrode side is welded to an inner surface of the battery lid 105.

(6) The battery lid 105 is subsequently fit to the opening of the battery case 101 and then the fitting surface of the battery lid 105 and the battery case 101 are welded for sealing.

(7) Lastly, an electrolyte is poured into the battery case 101 from an electrolyte inlet port 115 and then a plug 116 is inserted into the electrolyte inlet port 115 to be welded. Consequently, the electrolyte inlet port 115 is sealed to complete the battery.

However, there sometimes arises the following various issues with the battery as in above.

(i) It is necessary to weld the case to a target for extracting a potential in order to have the potential of the positive or negative electrode at the case. At this time, dust, spatters, and the like, which are generated by welding, may contaminate the constituent components of the battery to cause a problem such as corrosion and short circuit. Moreover, the failure of welding itself may cause faulty electric continuity, a spark, and the like.

(ii) A sealing structure that blocks the inside of the container from outside air is necessary for the joining at an electrode drawing portion and a terminal block while it is necessary for such a drawing portion and the like to join or assemble a plurality of parts. Therefore, it may be impossible to provide a perfect seal due to the deformation, displacement or the like of a sealing member, or the deterioration of the sealing capability caused by heating/cooling cycles during use may occur.

(iii) Moreover, elasticity, airtightness, heat resistance, an insulation property, and corrosion resistance are necessary for such a sealing member; however, materials that satisfy all such properties are few and expensive, and materials that can withstand repeated use are further limited.

The battery in the embodiment is capable of providing solutions for the above issues.

(a) The case and the current collector are held together with the rivets. Accordingly, substances that may produce an adverse effect on the function of a battery, such as dust from welding and spatters are less likely to exist, and therefore terminal assemblies are properly fixed.

(b) The current collector is stacked on the case having predetermined strength as a housing and electric conductivity, and at the same time an upper gasket having elasticity is held. Accordingly, the case and the current collector are flexibly and firmly held and fixed without damage. Moreover, the terminal assemblies having proper electrical connection with the case are provided because joining parts are less likely to be displaced due to impact or vibrations.

(c) The sealing performance as a container can be ensured by bringing the upper gasket having elasticity, heat resistance, corrosion resistance, and airtightness into contact with the head of the rivet and the outer surface of the case. Especially when the rivet is flattened, the upper gasket deforms flexibly and thus gaps are less likely to be created between the rivet and the case, and the case and the current collector. Accordingly, proper contact and insulation can be achieved.

Other Configuration of Terminal Assemblies

Various configurations other than the configuration illustrated in FIG. 2 can be considered for the positive the terminal assembly. The features of the positive terminal assembly 10 of the battery can be more clearly described through some configurations provided below.

Figure 6:
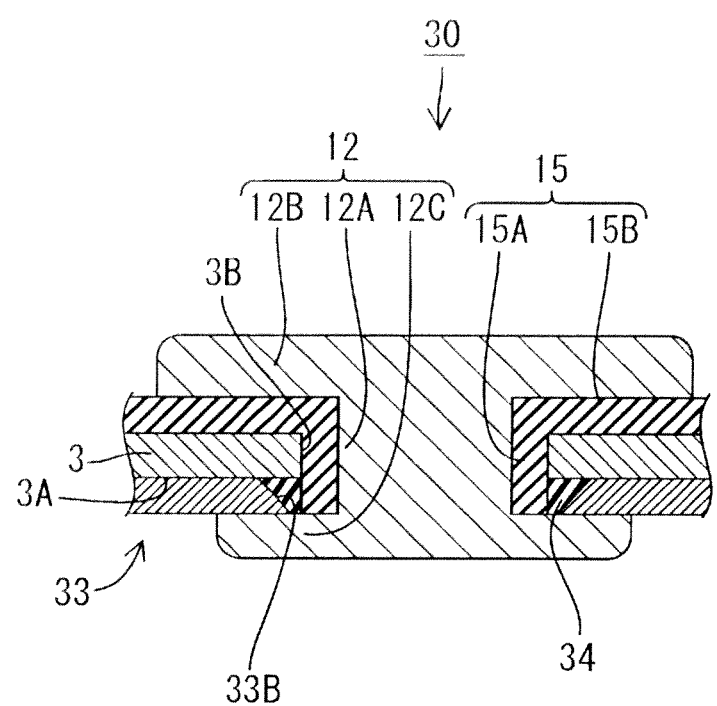
FIG. 6 is a schematic view illustrating a modification of the terminal assembly of the battery.

A positive terminal assembly 30 illustrated in FIG. 6 is different from the positive terminal assembly 10 only in a configuration of a contact area of an inner gasket 34 and an insertion hole 33B of a current collector 33. Other configurations are the same as the positive terminal assembly 10. The inner gasket 34 has a substantially triangular cross section, and is formed into a shape with an outside diameter thereof gradually decreasing toward the bottom. The insertion hole 33B of the current collector 33 is formed into a shape with an inside diameter thereof gradually decreasing toward the bottom. Accordingly, the inner gasket 34 and the current collector 33 are in contact with surfaces thereof that incline to an axis direction of the body 12A of the rivet 12. Accordingly, larger contact areas can be achieved between them a gap is further less likely to be formed in comparison to a configuration in which the current collector and the gasket are in contact with surfaces thereof that are parallel to the axis direction.

In the configuration illustrated in FIG. 6, the contact surface between the inner gasket 34 and the current collector 33 gradually inclines in a direction that approaches the rivet 12 toward the bottom. However, the contact surface between the inner gasket and the current collector is not limited to the above configuration. It may gradually incline in a direction away from the rivet 12 toward the bottom. However, according to the configuration illustrated in FIG. 6 the inner gasket 34 is held to the inclined surface of the current collector 33 before the rivet 12 is flattened. Therefore, the inner gasket 34 is less likely to come off the rivet 12.

Figure 7:
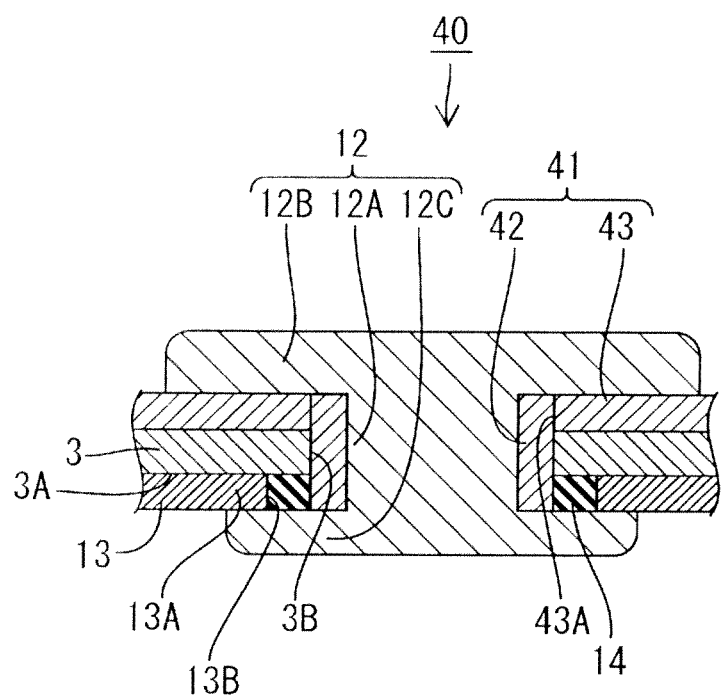
FIG. 7 is a schematic view illustrating a modification of the terminal assembly of the battery.

A terminal 40 for the positive electrode shown in FIG. 7 is different from the terminal 10 only in a configuration of an outer gasket, and the other configurations are the same as the terminal 10. An outer gasket 41 includes a tubular body 42 and a flat-plate body 43, which are provided separately from each other. The tubular body 42 is inserted in the mounting hole 3B. The flat-plate body 43 has a through hole 43A, and an upper part of the tubular body 42 is press-fitted in the through hole 43A. In the above-mentioned outer gasket 15 including the tubular portion 15A and the base portion 15B integrally provided, an area in contact with the body 12A of the rivet 12 and an area in contact with the head 12B of the rivet 12 and the lid 3 may receive different pressures from different directions (vectors), or amounts of heat transmitted from the other components are different. The differences may cause local distortion over long use.

In contrast, the outer gasket 41, the tubular body 42 and the flat-plate body 43 are provided separately from each other. Therefore, loads are spread and elasticity, heat resistance, corrosion resistance and airtightness can be maintained for a long time. Moreover, the flat-plate body 43 that requires the sealing performance more strongly is formed of a material having high flexibility, for example, PPS, and the cylindrical body 42 that has especially a large contact area and requires heat resistance more strongly is formed of a material having high heat resistance, for example, FPA. In this manner, a change in materials to be used in accordance with a part makes it possible to form a gasket structure having higher functionality.

Figure 8:
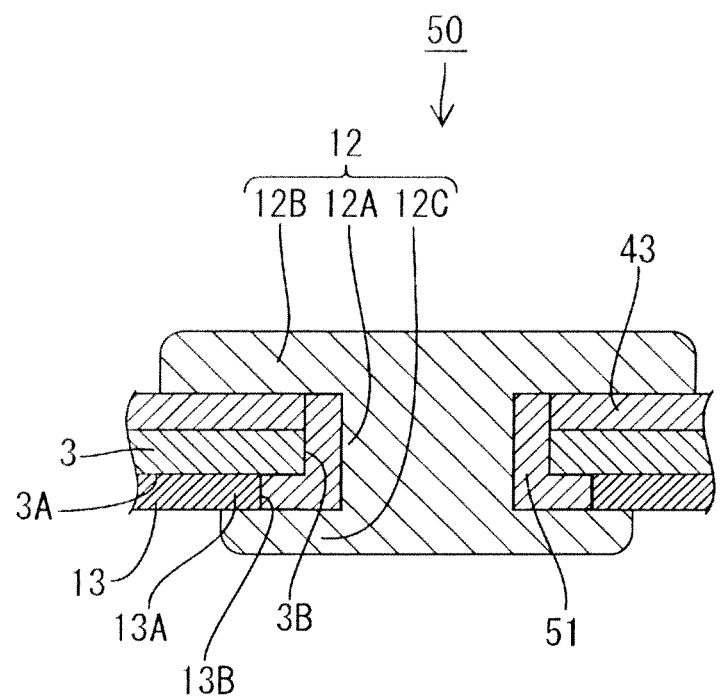
FIG. 8 is a schematic view illustrating a modification of the terminal assembly of the battery.

A positive terminal assembly 50 illustrated in FIG. 8 is different from the positive terminal assembly 40 only in a configuration of a gasket. The other configurations are the same as the positive terminal assembly 40. An inner gasket 51 includes the tubular body 42 and the inner gasket 14 in the configuration illustrated in FIG. 7 formed in one piece. An inner surface of the inner gasket 51 is in contact with the body 12A of the rivet 12, and an outer peripheral surface thereof is in contact with the lid 3, the current collector 13 and the flat-plate body 43. Similarly to the configuration illustrated in FIG. 7, the load applied to the inner gasket 50 is spread and elasticity, heat resistance, corrosion resistance and airtightness can be maintained for a long time. Moreover, the flat-plate body 43 that requires the sealing performance more strongly is formed of a material having high flexibility, for example, PPS, and the inner gasket 51 that has especially a large contact area and requires heat resistance more strongly is formed of a material having high heat resistance, for example, FPA. In this manner, it is possible to form a gasket structure having higher functionality.

Figure 9:
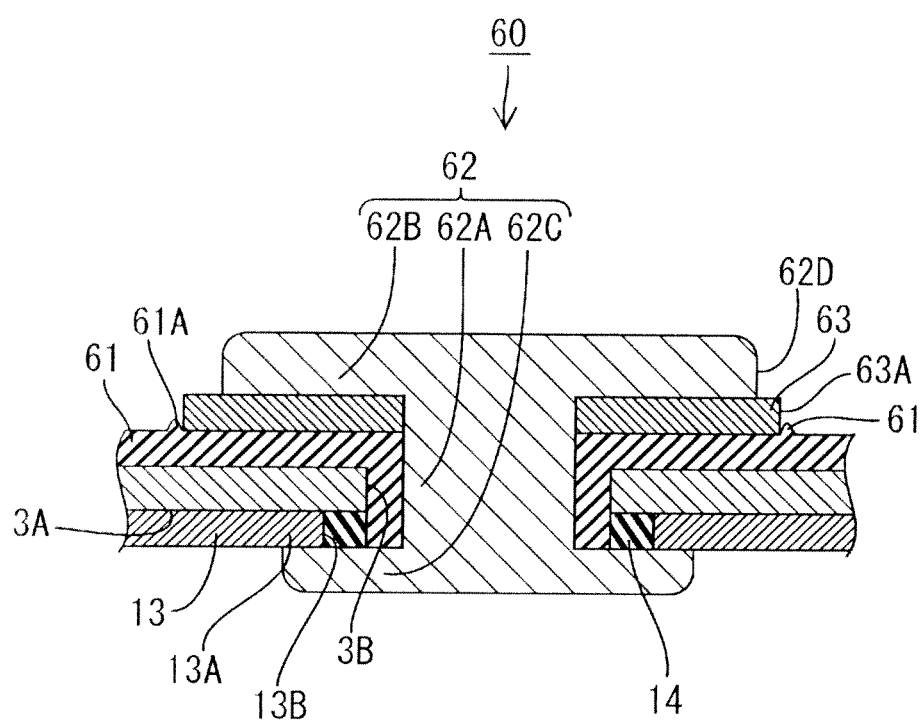
FIGS. 9 and 10 are schematic views illustrating modifications of the terminal assembly of the battery.

As illustrated in FIG. 9, a washer 63 is inserted between an outer gasket 61 and a head 62B of a rivet 62. The washer 63 that has the size to contain a peripheral edge 62D of the head 62B of the rivet 62 is inserted. Furthermore, the outer gasket 61 is disposed so as to contain a peripheral edge 63A of the washer 63. If the outer gasket 61 cannot be fully held with the size of the head 62B of the rivet 62, it is not possible to make full use of the elasticity of the outer gasket 61. The washer 63 enhances holding and fixing functions of the outer gasket 61. As illustrated in FIG. 9, an edge such as a projection 61A of the outer gasket 61 is provided in a position corresponding to the peripheral edge 63A of the washer 63, and the outer gasket 61 is disposed so as to contain the peripheral edge 63A of the washer 63. Accordingly, the outer gasket 61, the washer 63 and the rivet 62 are properly fixed.

Figure 10:
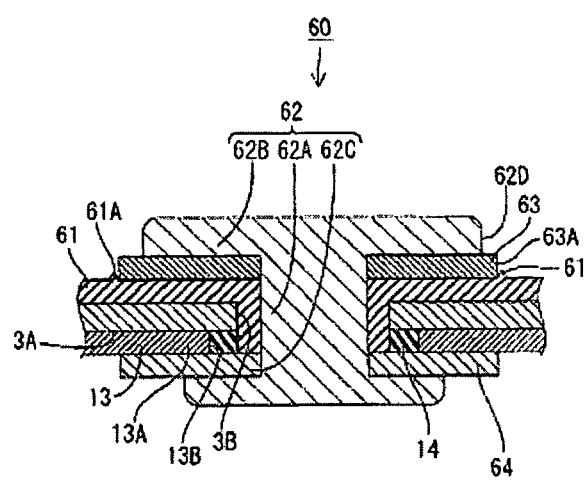

The five different configurations are described above. However, the configurations are not limited to them. Combinations thereof, for example, the triangular inner gasket 34 may be used in the configuration illustrated in FIG. 2 or 7. Moreover, a washer may be used. For example, as shown in FIG. 10, a washer 64 may be sandwiched between a flange of a rivet and a current collector. Moreover, the battery is used as an electric storage device. However, an electric double layer capacitor may be used as an electric storage device.

What is claimed is:

1. An electric storage device, comprising:
    a case comprising a mounting hole;
    a positive electrode and a negative electrode housed in the case;
    a current collector comprising a first end and a second end, the first end being connected to one of the positive electrode and the negative electrode, the second end being in direct contact with an inner surface of the case;
    a gasket including an inner gasket in contact with an area of the inner surface between the mounting hole and the second end of the current collector; and
    a conductive member including a body and an inside large-diameter portion having a greater diameter than a diameter of the body, the body being arranged in the mounting hole of the case, the inside large-diameter portion being disposed at one end of the body inside the case, electrically connected to the second end of the current collector, and being arranged so as to be in contact with the inner gasket such that the inner gasket and the second end of the current collector are sandwiched between the inside large-diameter portion and the case.

2. The electric storage device according to claim 1, wherein the inner gasket is sandwiched between the second end of the current collector and the body of the conductive member.

3. The electric storage device according to claim 1, wherein the conductive member further includes an outside large-diameter portion having a greater diameter than the diameter of the body, the outside large-diameter portion being disposed at another end of the body outside the case, and
    wherein the gasket further includes an outer gasket sandwiched between the outside large-diameter portion of the conductive member and an outer surface of the case.

4. The electric storage device according to claim 3, further comprising an outer washer having a smaller diameter than a diameter of the outer gasket, the outer washer being disposed between the outside large-diameter portion of the conductive member and the outer gasket.

5. The electric storage device according to claim 4, wherein the outer gasket includes a projection in contact with an outer peripheral surface of the outer washer.

6. The electric storage device according to claim 3, wherein the inner gasket and the outer gasket comprise different materials.

7. The electric storage device according to claim 3, wherein the gasket further includes a tubular gasket comprising an outer peripheral surface and an inner peripheral surface, the outer peripheral surface being in contact with a wall of the mounting hole, the inner peripheral surface being in contact with the body of the conductive member, the tubular gasket being integrally formed with at least one of the inner gasket and the outer gasket, and
    wherein the at least one of the inner gasket and the outer gasket comprises a through hole with an edge in contact with the tubular portion for an entire outer circumference.

8. The electric storage device according to claim 1, wherein the conductive member comprises a sloped surface angled with respect to an axis of the body, and
    wherein the second end and the inner gasket are in contact with the sloped surface.

9. The electric storage device according to claim 1, further comprising an inner washer disposed between the second end of the current collector and the inside large-diameter portion of the conductive member.

10. The electric storage device according to claim 3, wherein the inner gasket and the outer gasket are integrally provided.

11. The electric storage device according to claim 7, wherein the inner gasket, the outer gasket, and the tubular gasket are integrally provided.

12. The electric storage device according to claim 1, wherein the second end is electrically connected to the inner surface of the case.

13. The electric storage device according to claim 1, wherein the second end abuts the inner surface of the case.

14. The electric storage device according to claim 1, wherein the inner gasket abuts a side wall of the inner surface of the case.

15. The electric storage device according to claim 1, wherein the inside large-diameter portion abuts a bottom surface of the second end of the current collector.

16. The electric storage device according to claim 3, wherein the second end of the current collector and the inner gasket are sandwiched between an upper surface of the inside large-diameter portion and a bottom surface of the outside large-diameter portion.

17. An electric storage device, comprising:
    a case comprising a mounting hole;
    an electrode housed in the case;
    a current collector comprising:
        a first end connected to the electrode; and
        a second end being in direct contact with an inner surface of the case;
    a gasket in contact with an area of the inner surface between the mounting hole and the second end of the current collector; and
    a conductive member comprising:
        a body arranged in the mounting hole of the case;
        a flange disposed at a bottom surface of the body inside the case; and
        a head disposed at an upper surface of the body outside the case,
    wherein the second end of the current collector and the gasket are sandwiched between an upper surface of the flange and a bottom surface of the head.

18. The electric storage device according to claim 17, wherein the flange is electrically connected to the second end of the current collector, and is arranged so as to be in contact with the gasket such that the gasket and the second end of the current collector are sandwiched between the flange and the case.

19. The electric storage device according to claim 18, wherein the gasket abuts a side wall of the inner surface of the case, and wherein the flange abuts a bottom surface of the second end of the current collector.

* * * * *